US012629756B2

(12) United States Patent
Kamata et al.

(10) Patent No.: US 12,629,756 B2
(45) Date of Patent: May 19, 2026

(54) WORKPIECE RETAINING DEVICE

(71) Applicants: TPR CO., LTD., Tokyo (JP); TPR INDUSTRY CO., LTD., Yamagata (JP)

(72) Inventors: Koji Kamata, Yamagata (JP); Hideki Aizawa, Yamagata (JP); Koji Okuyama, Yamagata (JP)

(73) Assignees: TPR CO., LTD., Tokyo (JP); TPR INDUSTRY CO., LTD., Yamagata (JP)

( * ) Notice: Subject to any disclaimer, the term of this patent is extended or adjusted under 35 U.S.C. 154(b) by 524 days.

(21) Appl. No.: 18/265,958

(22) PCT Filed: Dec. 7, 2020

(86) PCT No.: PCT/JP2020/045472
§ 371 (c)(1),
(2) Date: Jun. 7, 2023

(87) PCT Pub. No.: WO2022/123625
PCT Pub. Date: Jun. 16, 2022

(65) Prior Publication Data
US 2023/0373012 A1    Nov. 23, 2023

(51) Int. Cl.
*B23B 31/16* (2006.01)
(52) U.S. Cl.
CPC .................................... *B23B 31/16* (2013.01)
(58) Field of Classification Search
CPC ........ B23B 31/16158; B23B 31/16179; B23B 2231/22; B23B 2231/56; B23B 2270/205; B23B 2270/12; B23B 2270/06; B23B 31/16

USPC .......................... 279/121, 122, 123, 132, 133
See application file for complete search history.

(56) References Cited

U.S. PATENT DOCUMENTS

| | | | |
|---|---|---|---|
| 5,749,274 A | 5/1998 | Chiba |
| 5,970,829 A | 10/1999 | Conley |

FOREIGN PATENT DOCUMENTS

| | | |
|---|---|---|
| JP | US62-159209 A | 10/1987 |
| JP | H04-102708 U | 9/1992 |
| JP | H09-066401 A | 3/1997 |
| JP | 2000-142558 A | 5/2000 |
| JP | 4522108 B | 8/2010 |

OTHER PUBLICATIONS

Patent Cooperation Treaty, International Search Report, Application No. PCT/JP2020/045472, dated Feb. 22, 2021, in 6 pages.

*Primary Examiner* — Alan Snyder
(74) *Attorney, Agent, or Firm* — PROCOPIO, CORY, HARGREAVES & SAVITCH LLP

(57)    ABSTRACT

A device according to the present disclosure is a workpiece retaining device 10 that retains a retained portion 110 of an axial-directional end portion of a workpiece 100 that is cylindrical. The workpiece retaining device 10 includes a core member 32 that is round and that comes into contact an inner perimeter face of the retained portion 110 of the workpiece 100, a pressing member 33 that presses an outer perimeter face of the retained portion 110 of the workpiece 100 to an inner side in a radial direction, and an aligning member 44 that, upon a pressing force from the pressing member 33 acting thereupon, allows the core member 32 to move in the radial direction, in accordance with a magnitude and a direction of the pressing force.

8 Claims, 9 Drawing Sheets

BASAL END PORTION

DISTAL END PORTION

DISTAL END PORTION

BASAL END PORTION

WORKPIECE RETAINING DEVICE

CROSS-REFERENCE TO RELATED APPLICATIONS

This application is US National Stage of International Patent Application PCT/JP2020/045472, filed Dec. 12, 2020, the contents of both of which are incorporated herein by reference.

TECHNICAL FIELD

The present invention relates to a workpiece retaining device.

BACKGROUND ART

In a diesel engine or the like, a carbon scraper ring that is fitted to a cylinder liner top portion (position of top dead center of piston top land) in the engine and scrapes off hard carbon when a piston ascends is used as a functional part for scraping off hard carbon that has been deposited on the piston. There are cases in which carbon scraper rings that function in this way are required to be thin walled.

Various types of devices have been proposed for manufacturing metal ring-like members that are thin walled, such as these carbon scraper rings (see Patent Documents 1 and 2, etc.). For example, a device is used in which an end portion of a cylindrical workpiece that is thin walled is chucked and supported cantilevered, and the unsupported side (product portion) is sequentially cut by a cutting-off process or the like, so as to obtain 10 to 20 rings, for example. With such a device, chucking without generating strain in the workpiece, not allowing chattering to occur when processing, and so forth, are particularly important.

CITATION LIST

Patent Document

Patent Document 1: Patent Publication JP H09-066401A
Patent Document 2: Japanese Patent No. JP4522108B

SUMMARY

Technical Problem

However, in practice, there are cases in which strain is generated in the workpiece when chucking particularly thin-walled materials such as pipe material, and this can affect the roundness of the rings after processing. This is particularly readily manifested in cases in which the workpiece is thin walled. Also, when the amount of overhang of the cantilevered workpiece is great, chattering easily occurs at the time of processing, and securing processing precision tends to be difficult. Conversely, there is a possibility that fabricating a dedicated chuck would lead to an extremely complicated structure, and be costly.

As a technique to handle these problems, it is conceivable to divide processes of processing (instead of cutting a certain number of rings from the workpiece while chucking is performed one time (one chuck), repeating chucking, such as for example, (1) outer side processing=>inner side processing=>cutting=>one-side beveling processing=>other-side beveling processing, for a total of chucking five times, or (2) cutting=>outer side processing=>inner side processing=>one-side beveling processing=>other-side beveling processing, for a total of chucking five times). However, in a case of dividing the processes of processing, there are cases in which securing precision of inner beveling, inner/outer concentricity, roundness, and so forth, becomes difficult due to the effects of chucking precision.

Accordingly, it is an object of the present invention to provide a workpiece retaining device that enables processing of cylindrical workpieces that are thin walled, with greater precision.

Solution to Problem

An aspect of the present invention is a workpiece retaining device, which is a device that retains a retained portion of an axial-directional end portion of a workpiece that is cylindrical. The workpiece retaining device includes a core member that is round and that comes into contact an inner perimeter face of the retained portion of the workpiece, a pressing member that presses an outer perimeter face of the retained portion of the workpiece to an inner side in a radial direction, and an aligning member that, upon a pressing force from the pressing member acting thereupon, allows the core member to move in the radial direction, in accordance with a magnitude and a direction of the pressing force.

In the workpiece retaining device that presses the outer perimeter face and the inner perimeter face of the axial-directional end portion of the workpiece respectively by the pressing member and the core member so as to chuck and support cantilevered, when the workpiece is out of round, or the thickness is not uniform, this can influence the processing precision, and the thinner walled the workpiece is, the greater the degree thereof is. With respect to this point, in the workpiece retaining device according to the aspect above, equalizing (positional correction and uniformization and homogenization of distribution of the pressing force such that the members and the workpiece are concentric) is performed by the core member moving in the radial direction in accordance with the magnitude and direction of the pressing force from the outer side by the pressing member, and deformation of the workpiece when chucking and chattering when processing are suppressed. Accordingly, cylindrical workpieces that are thin walled can be processed with greater precision.

Also, according to the workpiece retaining device of the above aspect, the entire workpiece can be processed with good precision with one chuck, without dividing the processes of processing, and accordingly is free from reduced precision due to effects (deviation, shift, and so forth of the workpiece) that can occur each time chucking is performed.

In the workpiece retaining device according to the aspect such as described above, the aligning member may be configured of an elastic member that deforms in accordance with the magnitude and the direction of the pressing force from the pressing member.

The workpiece retaining device according to the aspect such as described above may further include an attaching bolt for attaching the core member to a predetermined position of the workpiece retaining device, and a sleeve-like elastic member that is disposed around the attaching bolt may be used as the aligning member.

In the workpiece retaining device according to the aspect such as described above, the sleeve-like elastic member may be made of resin, made of rubber, or made of silicone.

In the workpiece retaining device according to the aspect such as described above, the attaching bolt may be a shoulder bolt that is inserted into a through hole provided in the core member, and the elastic member may have a form matching a gap form between the through hole and the attaching bolt.

In the workpiece retaining device according to the aspect such as described above, a plurality of members may be disposed equidistantly in a circumferential direction as the pressing member.

In the workpiece retaining device according to the aspect such as described above, the pressing member may be provided with a gripper portion that improves frictional force with regard to the retained portion of the workpiece.

In the workpiece retaining device according to the aspect such as described above, of a perimeter face of the core member, a portion that comes into contact with the inner perimeter face of the workpiece may be tapered.

In the workpiece retaining device according to the aspect such as described above, the retained portion of the workpiece may be a portion excluding a portion that becomes a final product, and the workpiece, regarding which a tapered portion that matches the perimeter face of the core member that is tapered is formed in advance on the inner perimeter face of the retained portion, may be an object of retaining.

The workpiece retaining device according to the aspect such as described above may further include a device that retracts the workpiece in the axial direction, and an inclined wall face that causes component force toward the inner side of the workpiece in the radial direction to act on the pressing member, in conjunction with retraction by the retracting device.

Advantageous Effects of Invention

According to the present invention, cylindrical workpieces that are thin walled can be processed with greater precision.

DESCRIPTION OF EMBODIMENTS

A configuration of the present invention will be described below in detail by way of an example of an embodiment illustrated in the Figures (see FIG. 1 to FIG. 9).

Figure 1:
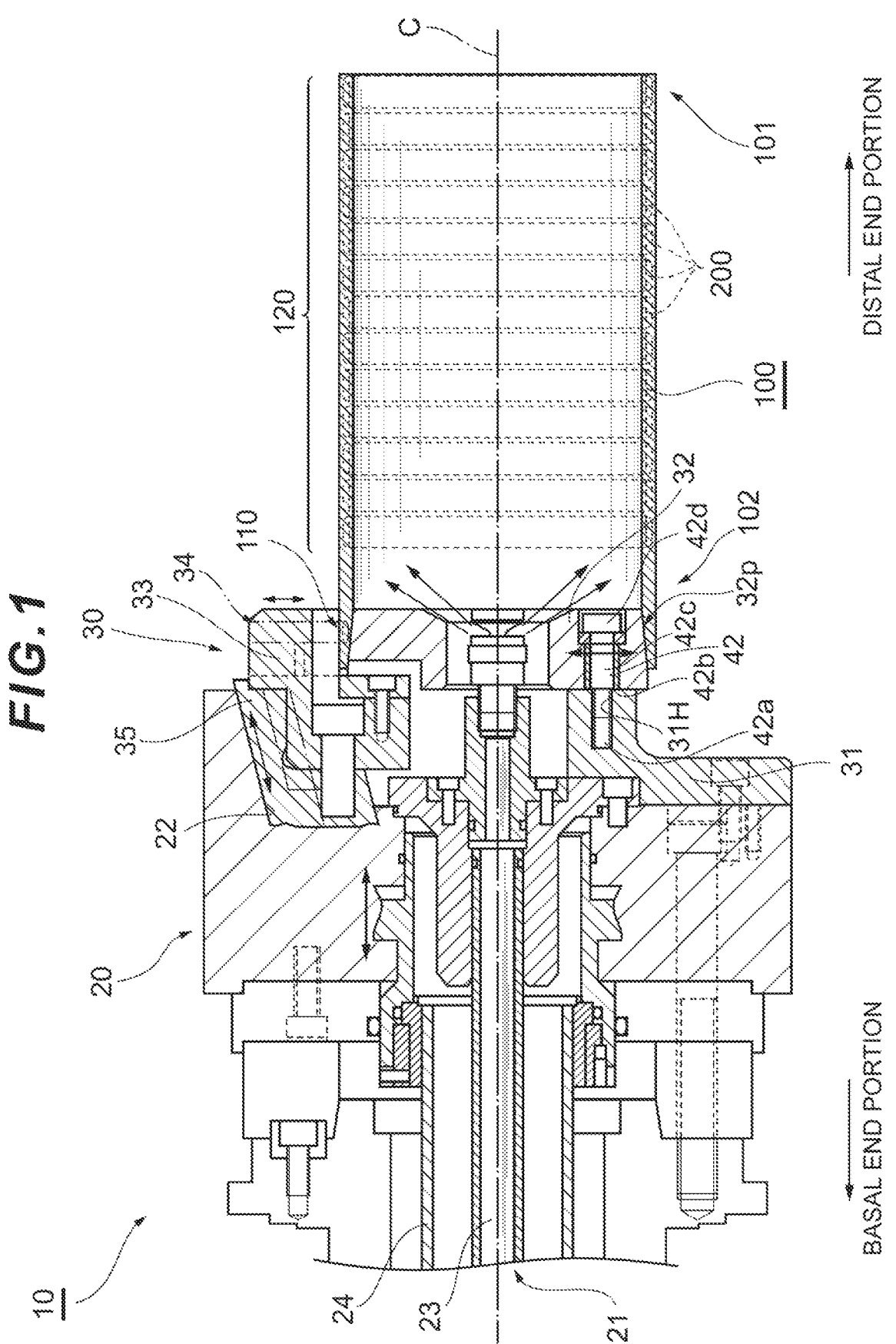
FIG. 1 is a lateral sectional view of an embodiment of a workpiece retaining device.

A workpiece retaining device 10 illustrated in FIG. 1 is a device that retains a retained portion 110 at a basal end portion 102 of a workpiece 100. The workpiece 100 that is retained by this device is a workpiece that is cylindrical and thin walled, and in a retained state thereof, a product portion (a portion that is processed to become products) 120 is sequentially cut off from a distal end portion 101 side and processed into metal ring-like members 200 that are thin walled (indicated by dashed lines in FIG. 1 and so forth), such as carbon scraper rings. Note that in the present specification, the side on the distal end portion 101 along an axial direction of the workpiece 100 retained by the workpiece retaining device 10 will be referred to as "distal end side", and the side on the basal end portion 102 as "basal end side", for the sake of convenience (see FIG. 1 and so forth). Also, a hypothetical center axis when the workpiece 100 is retained by the workpiece retaining device 10 is indicated by reference sign C (see FIG. 1 and so forth).

The workpiece retaining device 10 according to the present embodiment is made up of a device main unit 20 and a chuck unit 30 (see FIG. 1 and so forth). The device main unit 20 is provided with a retracting device (indicated by reference sign 21 in FIG. 1), that is of a hydraulic type for example, that retracts the chuck unit 30 toward the basal end side (the side where the device main unit 20 is situated) along the axial direction of the workpiece 100 via a pipe 24. A known device conventionally in use (description of details thereof will be omitted in the preset specification) can be applied as this retracting device 21. Note that reference sign 23 denotes a fluid-supplying pipe that feeds and supplies a cutting fluid to the distal end side, in order to flush out chips on the inner perimeter of the workpiece 100 when processing the workpiece 100 (see FIG. 1 and so forth).

An inclined wall face 22 that comes into contact with part of the chuck unit 30 is formed on the device main unit 20 (see FIG. 1 and so forth). This inclined wall face 22 is configured as a tapered face, for example, which narrows and the diameter thereof becomes smaller the further toward the basal end side.

The chuck unit 30 is configured to be capable of chucking and retaining the workpiece 100, and also of retraction thereof toward the basal end side by the retracting device 21. The chuck unit 30 of the workpiece retaining device 10 according to the present embodiment includes a base member 31, a core member 32, jaw members 33, workpiece grippers 34, intermediate members 35, stoppers 36, attaching bolts 42, elastic members 44, and so forth (see FIG. 2, FIG. 3, and so forth).

The base member 31 is attached and fixed to the device main unit 20 by bolts, which are not illustrated in particular (see FIG. 1 and so forth). The core member 32 is attached to the base member 31 in a state of being capable of movement in a radial direction (a direction perpendicular to the hypothetical center axis C) relative to the base member 31.

The core member 32 is a circular member as viewed from the axial direction, and comes into contact with an inner perimeter face of the retained portion 110 of the workpiece 100. In the present embodiment, a tapered core, having a tapered form that increases in diameter the further toward the basal end side, is employed as a portion of a perimeter face 32P of the core member 32 that comes into contact with an inner perimeter face of the workpiece 100 (see FIG. 1 and so forth). The core member 32 of which the perimeter face has such a tapered form is more easily attached to and detached from the workpiece 100 as compared to an insertion core that has a perimeter face of a uniform diameter. Note that an article in which a tapered portion 100t is formed on the inner perimeter face of the retained portion 110 in advance to match the tapered perimeter face 32P of the core member 32 may be employed as the workpiece 100 (see FIG. 8 and so forth). Using a wedging action of the retracting device 21 and the inclined wall face 22 as in the present embodiment enables the core member 32 and the tapered portion 100t to be brought into contact in a sure manner when chucking. The core member 32 is provided with through holes 32H through which the attaching bolts 42 are passed (see FIG. 5 and so forth).

Figure 2:
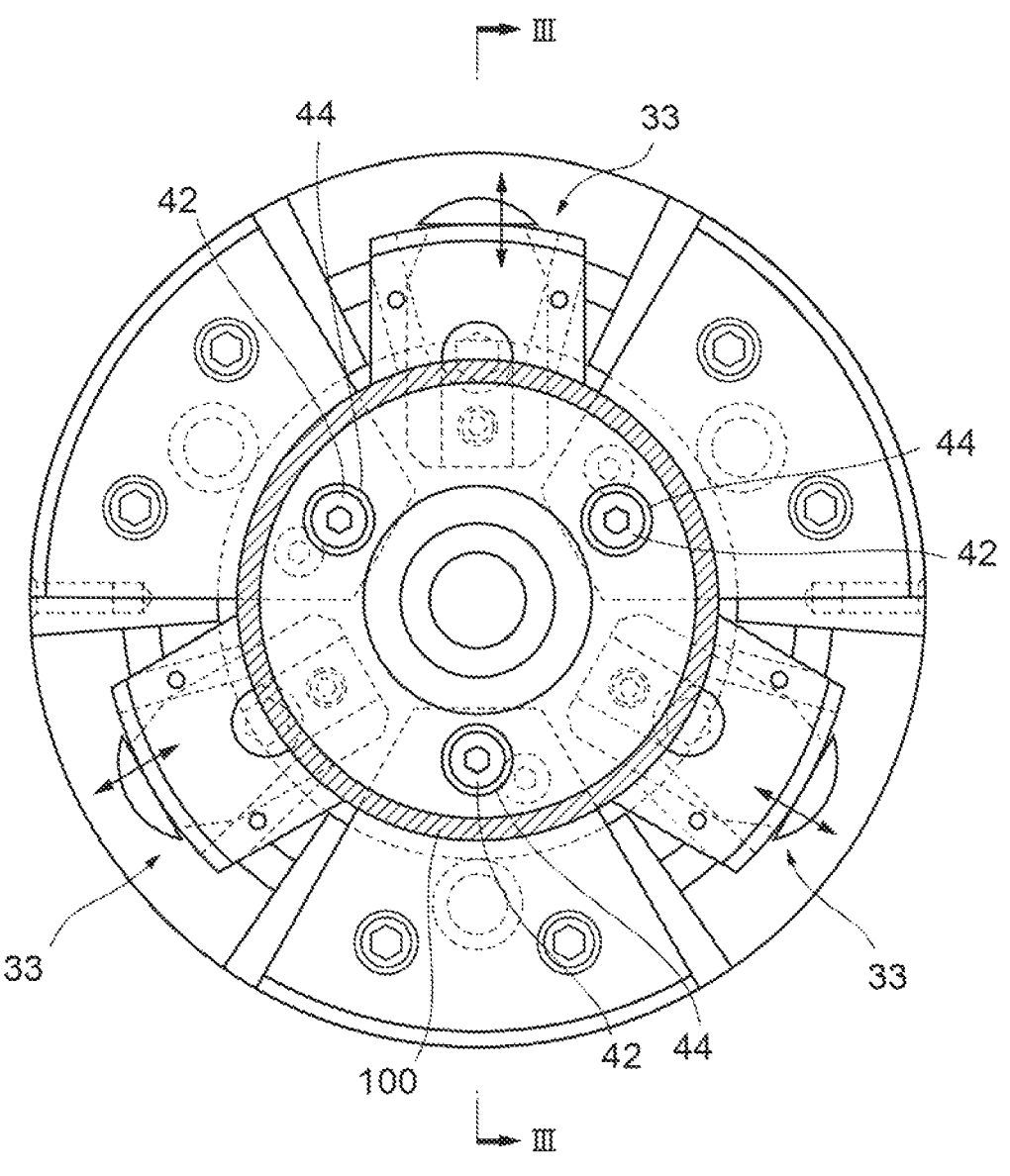
FIG. 2 is a diagram of a chuck unit of the workpiece retaining device and a workpiece retained by the chuck unit, as viewed from a distal end portion side of the workpiece.
Figure 3:
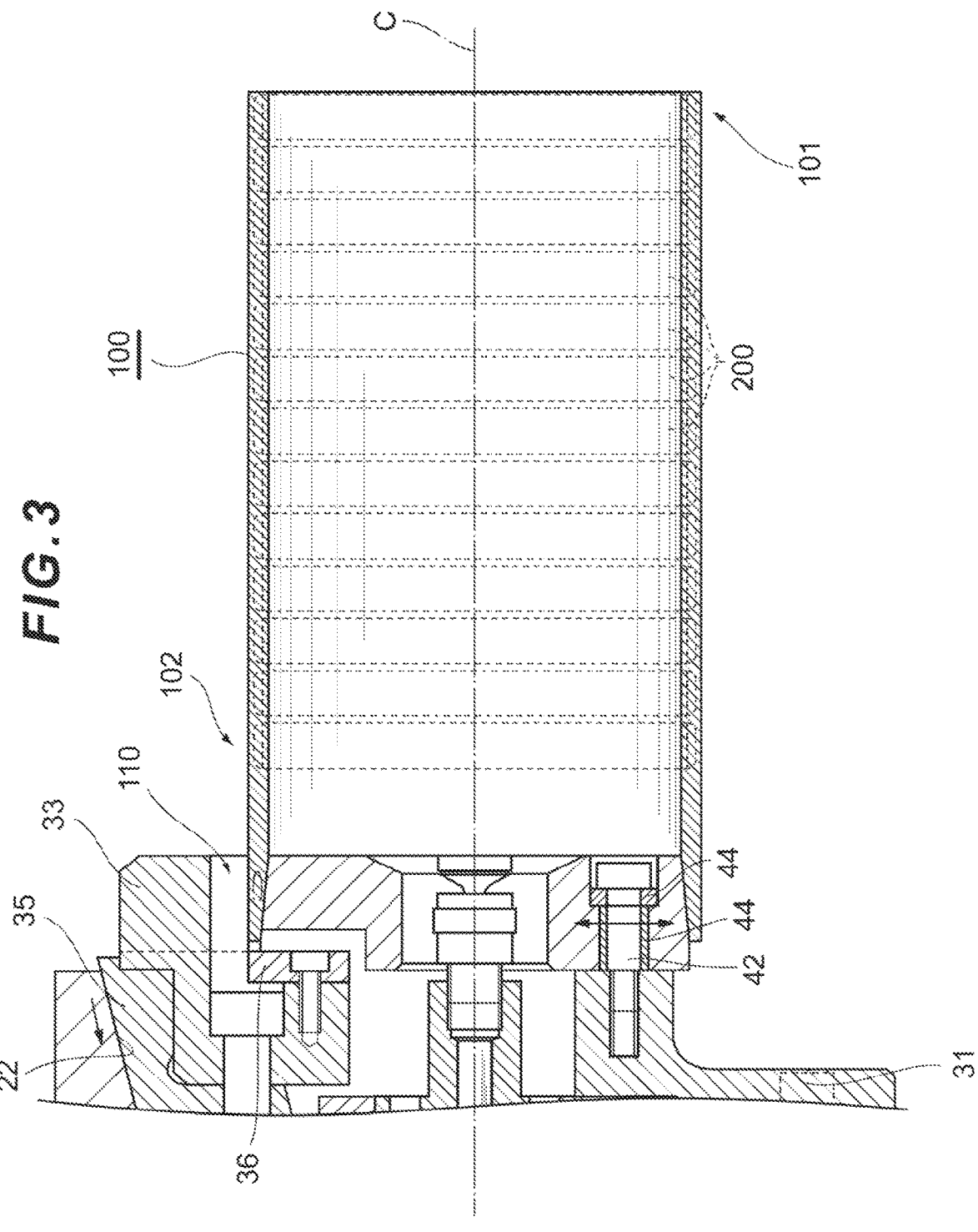
FIG. 3 is a longitudinal sectional view illustrating the chuck unit of the workpiece retaining device in a state of retaining the workpiece, corresponding to a sectional view taken along line III-III in FIG. 2.
Figure 4:
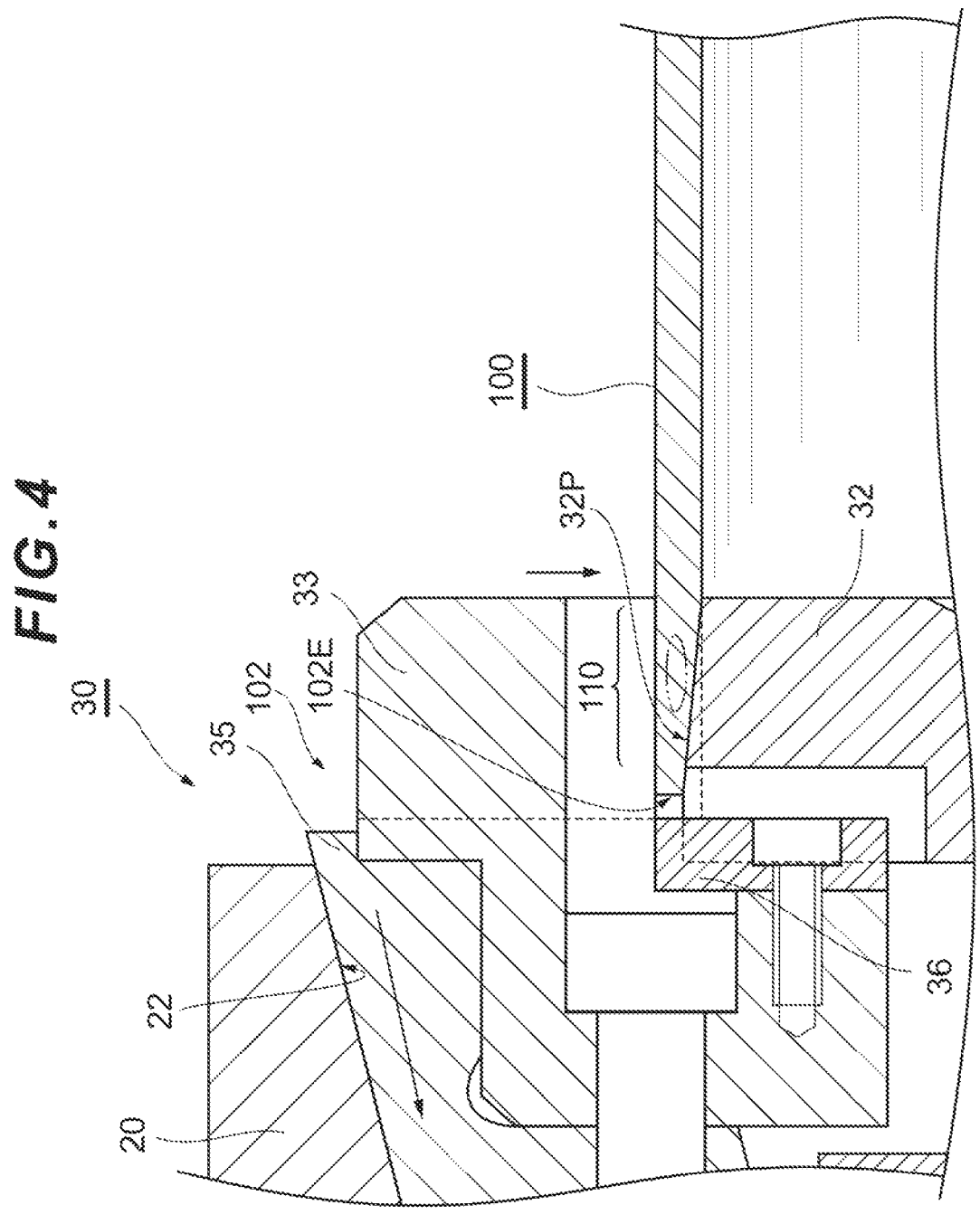
FIG. 4 is a diagram illustrating surroundings of a jaw member of the chuck unit of the workpiece retaining device illustrated in FIG. 3, in an enlarged manner.
Figure 5:
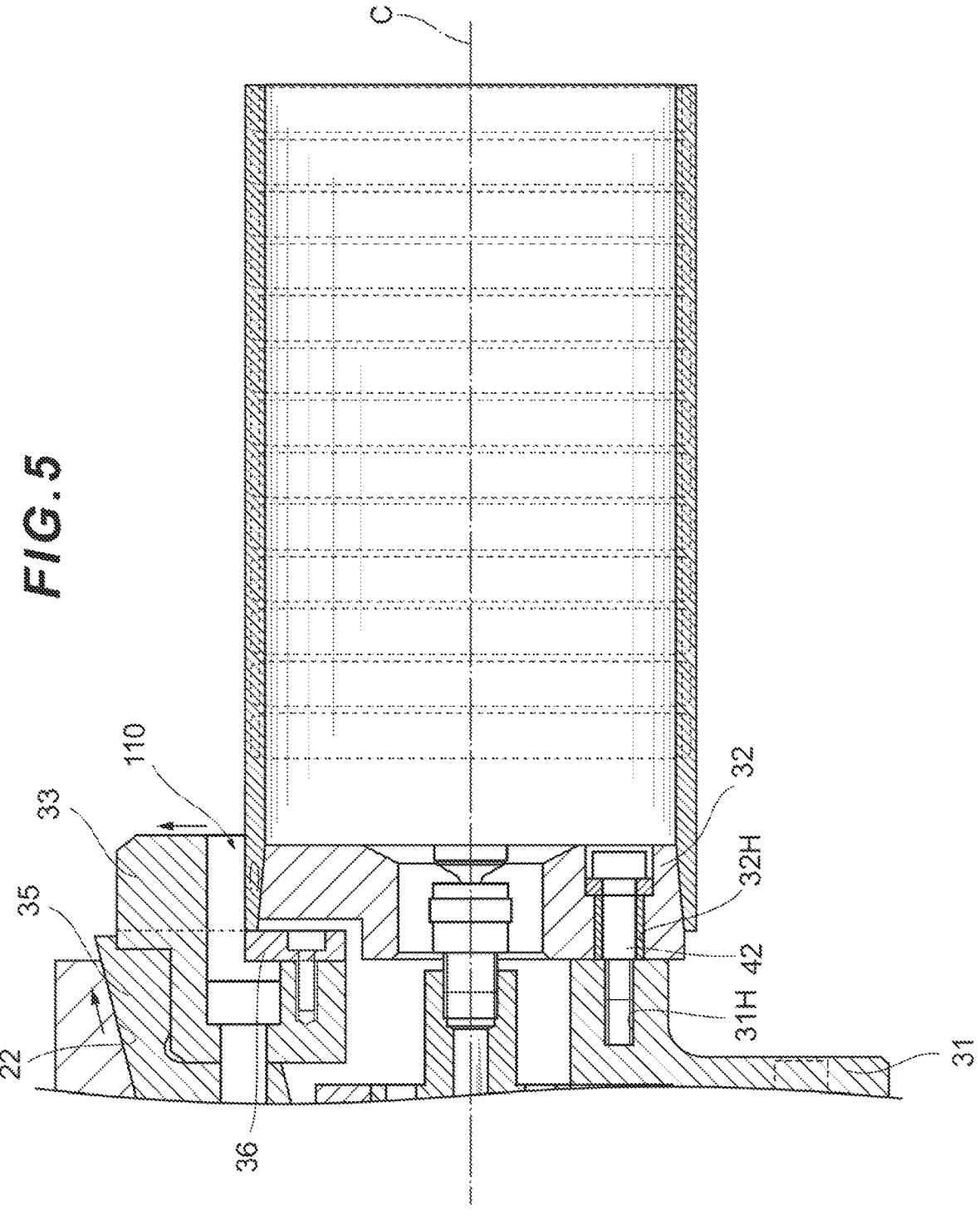
FIG. 5 is a longitudinal sectional view illustrating the chuck unit of the workpiece retaining device in a state in which chucking is disengaged by the jaw member.
Figure 6:
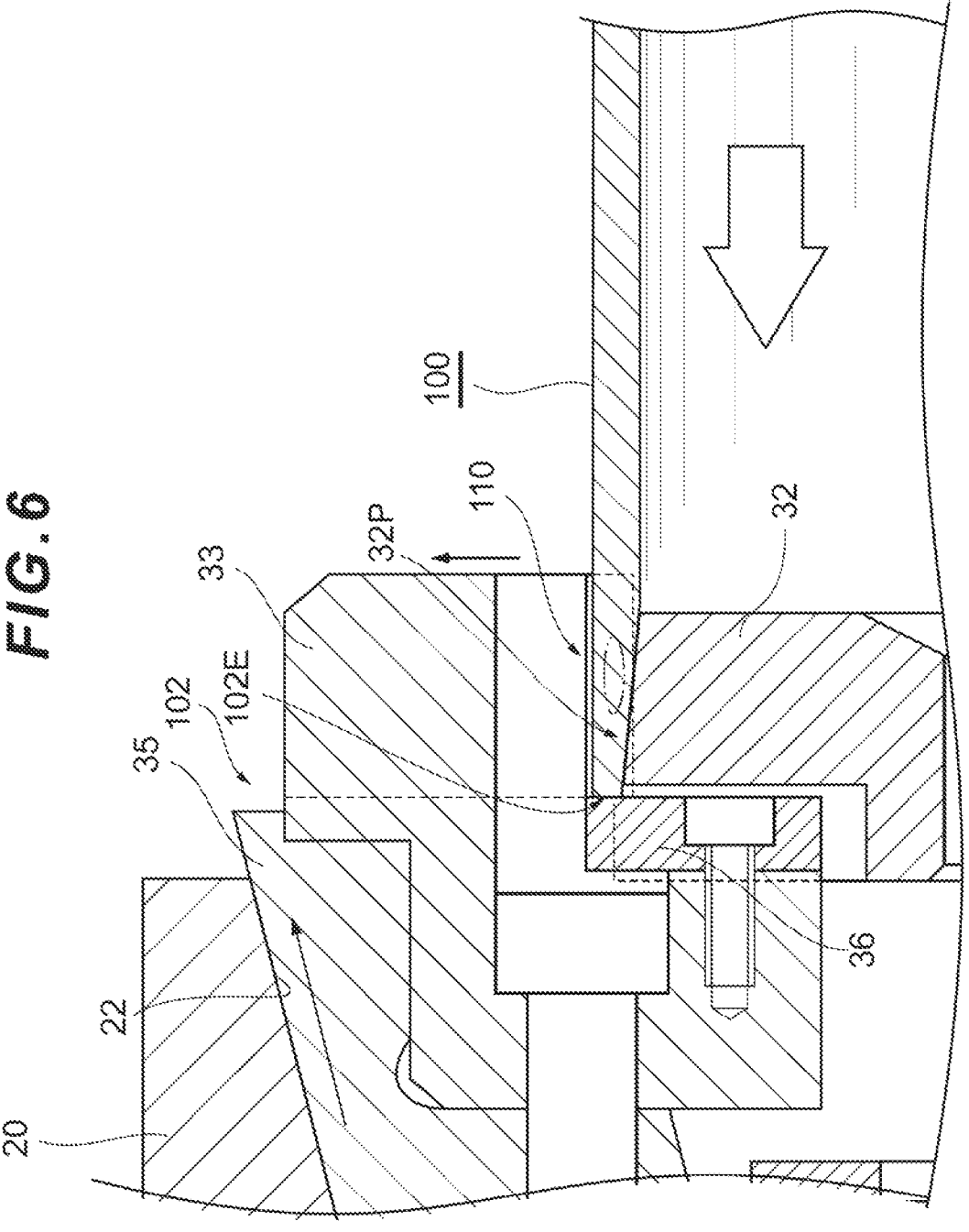
FIG. 6 is a diagram illustrating surroundings of the jaw member of the chuck unit of the workpiece retaining device illustrated in FIG. 5, in an enlarged manner.

The jaw members 33 are members that function as pressing members for pressing an outer perimeter face of the retained portion 110 of the workpiece 100 toward an inner side in the radial direction, with a plurality (e.g., three) thereof being disposed equidistantly (at 120° intervals) in a circumferential direction (see FIG. 2). Each of the jaw members 33 is provided so as to be capable of moving in the radial direction by each of claw guides (omitted from illustration) formed in the intermediate members 35 (see FIG. 2 and so forth). Each of these jaw members 33 is provided to act cooperatively with the intermediate members 35 (see FIG. 2, FIG. 3, and so forth), and presses the workpiece 100 with an increasingly great force under component force toward the inner side in the radial direction, due to the wedging action of the inclined wall face 22, as the chuck unit 30 is retracted to the device main unit 20 side by the retracting device 21 (see FIG. 4 and so forth).

Figure 7:
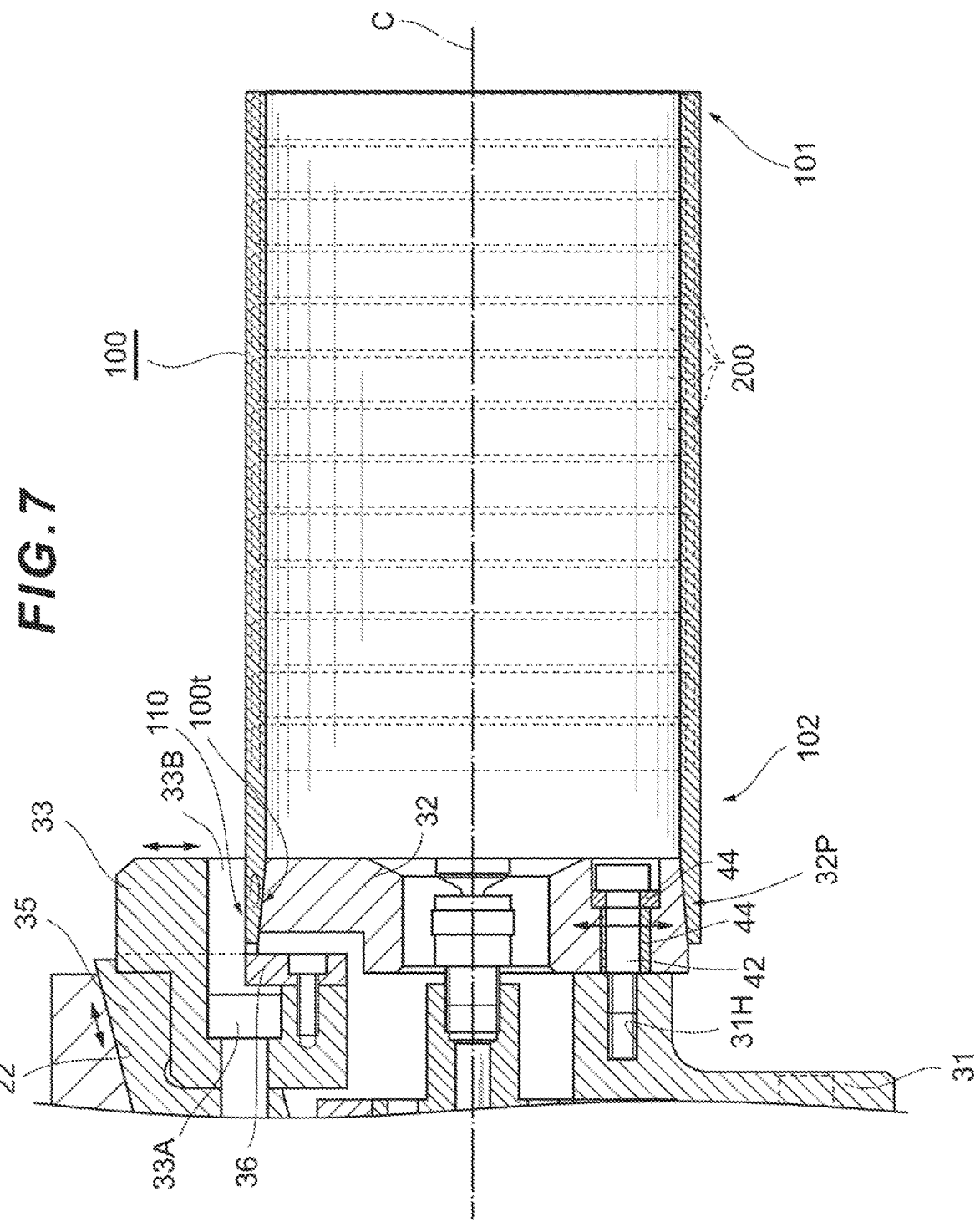
FIG. 7 is a longitudinal sectional view illustrating the chuck unit of the workpiece retaining device, in a state of retaining the workpiece and also in a state in which a core member has moved in a radial direction.
Figure 8:
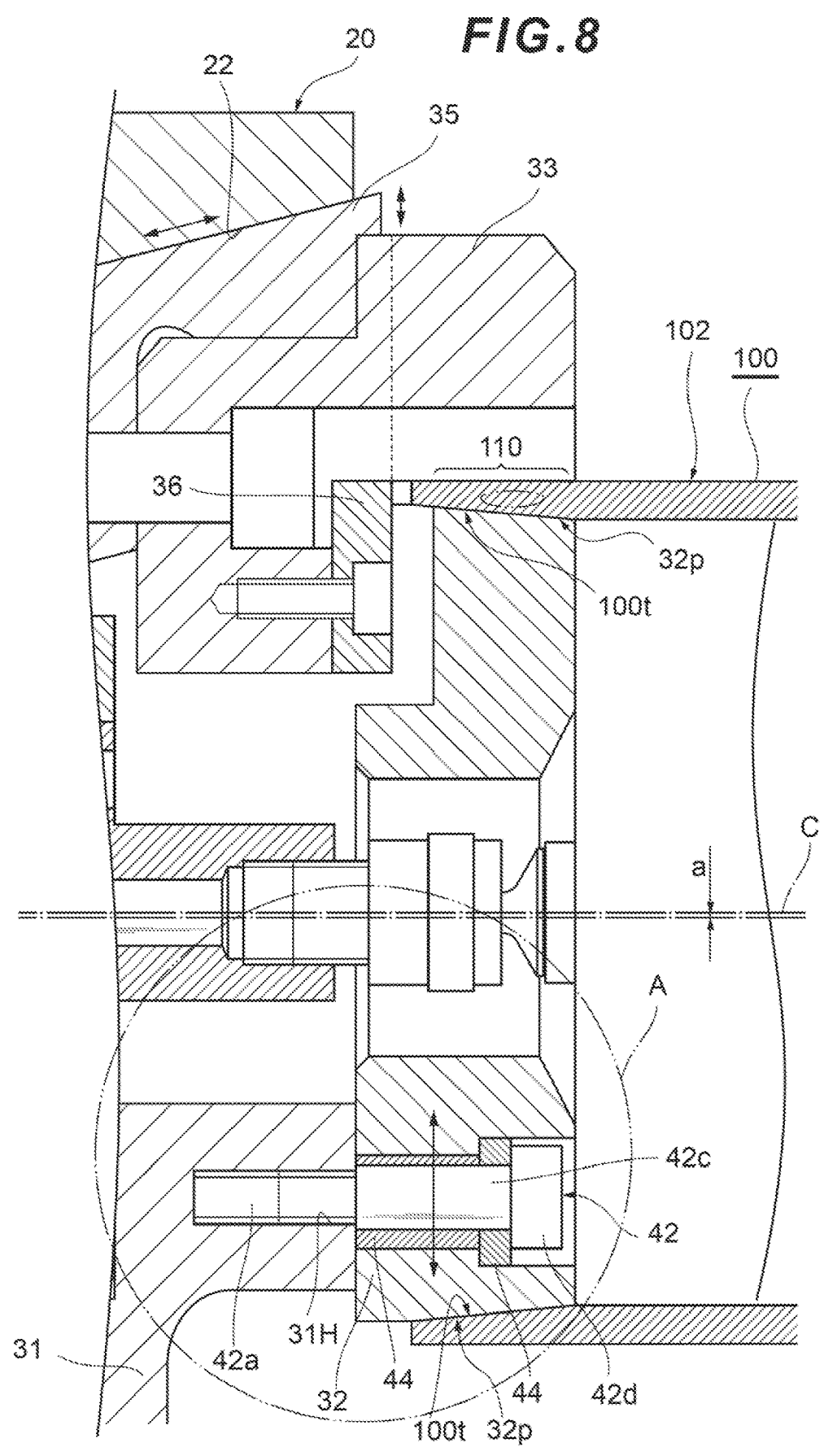
FIG. 8 is a diagram illustrating surroundings of the jaw member and an elastic member (aligning member) of the chuck unit of the workpiece retaining device illustrated in FIG. 7, in an enlarged manner.
Figure 9:
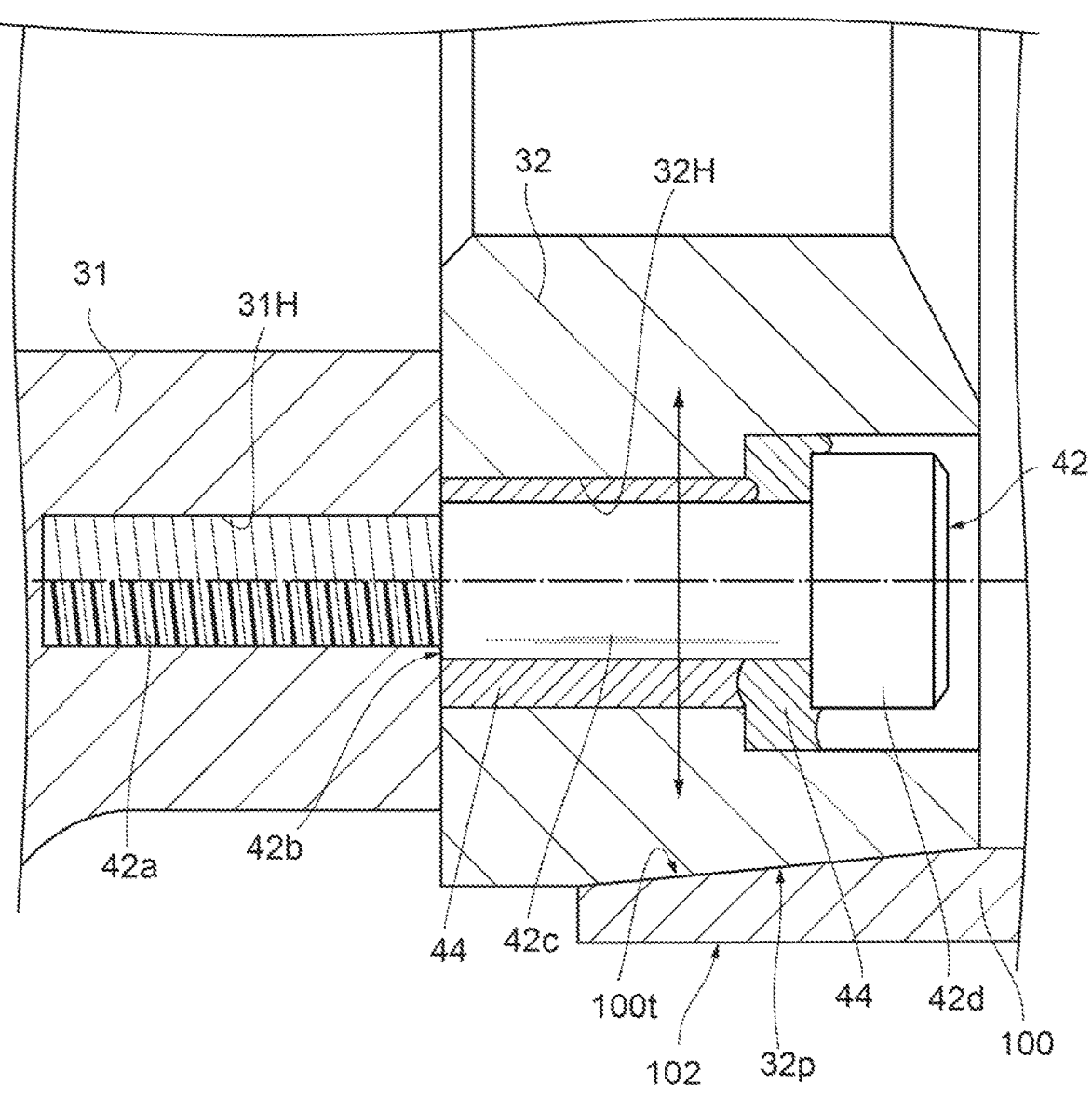
FIG. 9 is a diagram illustrating a part (the part enclosed by a circle denoted by the reference sign A) in FIG. 8, in an enlarged manner.

Now, attaching bolts 33A and hole portions 33B through which the attaching bolts 33A of the jaw members 33 are passed are illustrated in the longitudinal sectional views such as FIG. 7 and so forth, and the portions where the jaw members 33 are in contact with an outer perimeter face of the workpiece 100 are not illustrated, which makes it difficult to understand that the jaw members 33 are actually in contact with the outer perimeter face of the workpiece 100 at portions adjacent to both sides of the hole portions 33B in the circumferential direction, due to the present embodiment employing the jaw members 33 which are jaws that are forked.

The workpiece grippers (gripper portions) 34 are members that improve retaining force of the workpiece 100 by the chuck unit 30. The workpiece grippers 34 employed in the present embodiment are configured to suppress slipping of the workpiece 100 when rotating, by moving superhard spikes that are provided on inner portions of the jaw members 33 or in the proximity thereof to the inner side in the radial direction, and pressing end portions thereof against the outer perimeter face of the workpiece 100 to increase frictional force (see FIG. 1 and so forth).

The intermediate members 35 are members by which component force toward the inner side in the radial direction acts on the jaw members 33, due to the wedging action of the inclined wall face 22, as the chuck unit 30 is retracted to the device main unit 20 side by the retracting device 21, as described above (see FIG. 4 and so forth).

The stoppers 36 are members provided at positions where an edge portion 102E of the basal end portion 102 side of the workpiece 100 abuts, and regulate an axial-directional position of the workpiece 100 at the time of fitting the basal end portion 102 of the workpiece 100 between the core member 32 and the jaw members 33. In the present embodiment, the distal end portion 101, for example, of the workpiece 100 is biased toward the basal end portion 102, by a biasing device (omitted from illustration) made up of a spring, contact plate, or the like, the edge portion 102E of the workpiece 100 in a state that is not chucked by the chuck unit 30, is brought into contact with the stopper 36, and thus the axial-directional position of the workpiece 100 is regulated and the attitude thereof is maintained. Note that upon the chuck unit 30 being retracted into the basal end side (the side where the device main unit 20 is situated) in a state in which the axial-directional position of the workpiece 100 is regulated by the stoppers 36, and the workpiece 100 being chucked by the jaw members 33 and the core member 32 using the wedging action, the stoppers 36 move to the basal end side, and the edge portion 102E is in a state of being away from the stoppers 36 (see FIG. 3 and FIG. 4). Also, partway through the operations of moving the chuck unit 30 toward the distal end side to remove the workpiece 100, and relieving the chucking force due to the wedging action, there are cases in which the stoppers 36 abut the edge portion 102E and push it out toward the distal end side (see FIG. 5 and FIG. 6).

The attaching bolts 42 are bolts used for attaching the core member 32 to the base member 31. In the present embodiment, a plurality of (e.g., three) attaching bolts 42 and through holes 32H through which these attaching bolts 42 are passed are disposed at positions that are equidistant (at 120° intervals) in the circumferential direction, and equidistantly as to the jaw members 33 (at 60° intervals as to the jaw members 33) so as not to overlap on the jaw members 33 (see FIG. 2 and FIG. 5). Shoulder bolts may be employed as the attaching bolts 42. In the present embodiment, shoulder bolts, of which screw portions 42a are screwed into screw holes 31H of the base member 31, and shoulder portions 42b abut end faces around the screw holes 31H of the base member 31, are used as the attaching bolts 42 (see FIG. 1 and FIG. 7 to FIG. 9). According to such attaching bolts 42, the attachment depth, tightening torque, and so forth, of the bolts, can be easily made to be uniform.

The through holes 32H of the core member 32 are provided as holes through which the screw portions 42a of the attaching bolts 42 are passed, and which accommodate shaft portions 42c and head portions 42d. In the present embodiment, the through holes 32H have stepped forms matching the forms of the shaft portions 42c and the head portions 42d of the attaching bolts 42, and are holes formed having an inner diameter that is somewhat larger than these shaft portions 42c and head portions 42d, with predetermined gaps formed between the attaching bolts 42 and the through holes 32H (see FIG. 9 and so forth). The elastic members 44 are provided in these gaps.

The elastic members 44 are provided as an example of deformable aligning members that, when a pressing force acts on the retained portion 110 of the workpiece 100 from the outer perimeter side thereof by the jaw members 33, allow the core member 32 to move in the radial direction in accordance with the magnitude and direction of this pressing force. The elastic members 44 according to the present embodiment are formed in sleeve-like forms, and are disposed around the attaching bolts 42. Also, two types of sleeve-like elastic members with different diameters are disposed around the attaching bolts 42 in the present embodiment, in accordance with the attaching bolts 42 and the through holes 32H having stepped forms (see FIG. 9 and so forth). One of these two types of sleeve-like elastic members is pinched between the stepped portions of the through holes 32H and the head portions 42d of the attaching bolts 42, serving as a seat (see FIG. 9).

Aligning functions such as described below are realized in the workpiece retaining device 10 according to the present embodiment by the functions of the elastic members 44 that are elastically deformable and have flexibility as described above. That is to say, upon the retracting device 21 retracting the chuck unit 30, pressing force from the jaw members 33 acts on the workpiece 100 from the outer perimeter, due to the wedging effects of the inclined wall face 22, and the retained portion 110 of the workpiece 100 is checked by these jaw members 33 and the core member 32 (see FIG. 4 and so forth). At this time, when the pressing force acting on the workpiece 100 between the jaw members 33 and the core member 32 is uniform, there is no major influence, but in a case in which the pressing force is not uniform, due to factors such as differences in processing precision of the workpiece 100 and so forth, force is applied to the core member 32 in the radial direction, in accordance with the nonuniformity. At this time, in the workpiece retaining device 10, the elastic members 44 elastically deform under this force, and exhibit so-called equalizing (positional correction and uniformization and homogenization of distribution of the pressing force such that the members and the workpiece are concentric) functions by the core member 32 moving in the radial direction by an amount equivalent to a correction amount a (see FIG. 8) in accordance with the magnitude and direction of this force (see FIG. 7 to FIG. 9). In the workpiece retaining device 10 where the end portion (basal end portion 102) of the workpiece 100 is chucked by the jaw members 33 and the core member 32 and supported cantilevered, as in the present embodiment, in a case in which the workpiece 100 is out of round, or the thickness thereof is not uniform, this can influence the processing precision. However, with respect to this point, according to the workpiece retaining device 10 having the equalizing function described above, such influence can be maximally eliminated, and deformation of the workpiece 100 when chucking, and chattering when processing, can be suppressed. Also, in a case of cantilever supporting, there is a need to increase the chucking force (pressing force) and workpiece rigidity in order to suppress chattering from occurring when processing and to suppress the risk of the workpiece coming loose, but according to the workpiece retaining device 10 of the present embodiment having the core member 32, deformation of the workpiece 100 is suppressed even when the chucking force is increased, and also the workpiece 100 is firmly retained, and chattering does not occur. According to the above, cylindrical workpieces that are thin walled can be processed with greater precision. Also, as a conventional technique to performing processing of cylindrical workpieces that are thin walled with greater precision, there is a technique of dividing processes of processing (instead of cutting a certain number of rings from the workpiece while chucking is performed one time, chucking and ring cutting are repeated), but according to the workpiece retaining device 10 of the present embodiment, processing of cylindrical workpieces that are thin walled can be performed with precision with one chuck alone, without dividing the processes of processing as in this technique.

Also, according to the workpiece retaining device 10 as with the present embodiment configured as described above, (i) the cylindrical workpiece 100 that is thin walled can be processed with good processing, and accordingly deformation of the metal ring-like members 200 such as carbon scraper rings manufactured by processing workpieces can be suppressed and roundness can be secured, (ii) deformation of the workpiece 100 when chucking and chattering when processing can be suppressed, and accordingly a great number of the metal ring-like members 200 can be efficiently cut out from one workpiece 100 that is longer in overall length than conventionally, and (iii) operating the retracting device 21 in the axial direction enables the workpiece 100 to be automatically attached and detached, using the jaw members 33 of the mechanism that moves obliquely following the include of the inclined wall face 22 in accordance therewith.

Note that while the above-described embodiment is an example of a preferred embodiment of the present invention, the present invention is not limited thereto, and can be carried out in various modifications without departing from the spirit and scope thereof. For example, while the elastic members 44 provided around the attaching bolts 42 have been shown as an example of aligning members in the above-described embodiment, the above elastic members 44 are merely a preferred example with respect to form, material, and structure, and it is needless to say that other members that function in the same way, such as members made of rubber, silicone, or the like, for example, can be applied.

INDUSTRIAL APPLICABILITY

The present invention is suitably applied to various types of workpiece retaining devices, including workpiece retaining devices of robots, and those including NC and loaders.

REFERENCE SIGNS LIST

10 Workpiece retaining device
20 Device main unit
21 Retracting device
22 Inclined wall face
23 Pipe for supplying fluid
24 Pipe
30 Chuck unit
31 Base member
31H Screw hole to which attaching bolt is screwed
32 Core member
32H Through hole through which attaching bolt passes
32P Perimeter face
33 Jaw member (pressing member)
33A Attaching bolt
33B Hole portion
34 Workpiece gripper (gripper portion)
35 Intermediate member
36 Stopper
42 Attaching bolt
42a Screw portion
42b Shoulder portion
42c Shaft portion
42d Head portion
44 Elastic member (aligning member)
100 Workpiece
101 Distal end portion
102 Basal end portion
102E Edge portion of basal end portion side
100t tapered portion
110 Retained portion
120 Product portion

200 Carbon scraper ring (metal ring-like member that is final product)

a Correction amount

C Center axis

What is claimed is:

1. A workpiece retaining device, which is a device that retains a retained portion of an axial-directional end portion of a workpiece that is cylindrical, the workpiece retaining device comprising:

a core member that is round and that comes into contact an inner perimeter face of the retained portion of the workpiece;

a pressing member that presses an outer perimeter face of the retained portion of the workpiece to an inner side in a radial direction;

an aligning member that, upon a pressing force from the pressing member acting thereupon, allows the core member to move in the radial direction, in accordance with a magnitude and a direction of the pressing force; and an attaching bolt for attaching the core member to a predetermined position of the workpiece retaining device, wherein the aligning member is configured of a sleeve-like elastic member that is disposed around the attaching bolt and that deforms in accordance with the magnitude and the direction of the pressing force from the pressing member.

2. The workpiece retaining device according to claim 1, wherein the sleeve-like elastic member is made of resin, made of rubber, or made of silicone.

3. The workpiece retaining device according to claim 1, wherein the attaching bolt is a shoulder bolt that is inserted into a through hole provided in the core member, and the elastic member has a form matching a gap form between the through hole and the attaching bolt.

4. The workpiece retaining device according to claim 1, wherein a plurality of members are disposed equidistantly in a circumferential direction as the pressing member.

5. The workpiece retaining device according to claim 4, wherein the pressing member is provided with a gripper portion that improves frictional force with regard to the retained portion of the workpiece.

6. The workpiece retaining device according to claim 1, wherein, of a perimeter face of the core member, a portion that comes into contact with the inner perimeter face of the workpiece is tapered.

7. The workpiece retaining device according to claim 6, wherein the retained portion of the workpiece is a portion excluding a portion that becomes a final product, and the workpiece, regarding which a tapered portion that matches the perimeter face of the core member that is tapered is formed in advance on the inner perimeter face of the retained portion, is an object of retaining.

8. The workpiece retaining device according to claim 6, further comprising:

a retracting device that retracts the workpiece in the axial direction; and an inclined wall face that causes component force toward the inner side of the workpiece in the radial direction to act on the pressing member, in conjunction with retraction by the retracting device.

* * * * *